Oct. 12, 1965   W. A. SMITH ETAL   3,211,525
CONCENTRATING AND REACTING WITH NITRIC ACID
Filed Aug. 8, 1963   6 Sheets-Sheet 1

FIG. 1

INVENTORS
WILLIAM AUBREY SMITH
JOSEPH M. DOWNEY
JOSEPH J. JACOBS
STANLEY L. KRUGMAN
JOHN D. BUEHLER
FRED D. HUILLET
BY H.T. Serijan
and D. R. Stemple, Jr.

Oct. 12, 1965  W. A. SMITH ETAL  3,211,525
CONCENTRATING AND REACTING WITH NITRIC ACID
Filed Aug. 8, 1963  6 Sheets-Sheet 5

INVENTORS
WILLIAM AUBREY SMITH
JOSEPH M. DOWNEY
JOSEPH J. JACOBS
STANLEY L. KRUGMAN
JOHN D. BUEHLER
FRED D. HUILLET
BY
ATTORNEYS

United States Patent Office 3,211,525
Patented Oct. 12, 1965

3,211,525
CONCENTRATING AND REACTING WITH
NITRIC ACID
William Aubrey Smith, Pasadena, Calif., Joseph M.
Downey, Vicksburg, Miss., Joseph J. Jacobs, Altadena,
Stanley L. Krugman, Pasadena, and John D. Buehler,
Whittier, Calif., and Fred D. Huillet, Golden, Colo.,
assignors to American Metal Climax, Inc., New York,
N.Y., a corporation of New York
Filed Aug. 8, 1963, Ser. No. 301,937
30 Claims. (Cl. 23—160)

This application is a continuation-in-part of our co-pending applications, Serial No. 862,000, filed December 24, 1959, and now abandoned; 74,730 filed December 8, 1960, and now abandoned, and 164,792, filed January 8, 1962, and now abandoned.

This invention relates to new and useful improvements in concentrating nitric acid containing dissolved nitrate salts of the metals in group Ia having an atomic weight at least as heavy as potassium and particularly from a weak to a strong nitric acid solution. The resultant strong nitric acid may be removed as the product, fractionated up to 100% nitric acid or utilized in a process for reacting chlorides of potassium, sodium, and/or hydrogen to produce separated or mixed nitrates of potassium and sodium, chlorine, and nitrogen dioxide, the latter being subject to withdrawal as product or recycle to fortify nitric acid in the system. If potassium chloride is used as starting material, at least a portion of the resultant potassium nitrate may be dissolved in said nitric acid during the concentrating process.

The invention also relates to a process wherein the starting chloride is exposed to relatively high concentrations and excess stoichiometric quantities to maintain high concentrations of nitric acid in a stripping zone under conditions permitting complete stripping of chlorine and nitrogen oxide produced, although stripping of chlorine is more important as its presence tends to reverse the desired reaction. Further important features of the invention are using weak nitric acid for the first portion of the reaction and introducing strong nitric acid for only the final portion of the reaction and dividing the reaction zone into a gas reaction area in the absence of the starting chlorides and a solution reaction area with the chlorides.

Throughout this application, the term "strong nitric acid" refers to nitric acid concentrations with water wherein the acid component is greater than the normal azeotropic composition, i.e., from above about 68% up to 100% $HNO_3$ by weight. "Weak nitric acid" refers to any acid concentration with water below the normal azeotropic composition, i.e., below about 68% $HNO_3$ content. The normal water-nitric acid azeotrope containing 68% $HNO_3$ or thereabouts at atmospheric pressure is the dividing line, regardless of the actual azeotrope resulting from a given mixture which may be considerably removed from 68%, e.g., as made possible by the presence of various nitrates in solution as will be hereinafter discussed more fully. The concentrations for purposes of measurement unless otherwise specified, refer only to the nitric acid and water components and are not concerned with any other material, and particularly nitrates, which may also be present in the mixture.

As is well known, ordinary distillation and rectification will not produce strong nitric acid since an azeotrope containing about 68% nitric acid and 32% water is formed, i.e., both the liquid and vapor over a boiling solution have the same composition. The addition of various dehydrating agents has been known (e.g., sulfuric acid and magnesium nitrate) to avoid the normal azeotrope formation and thus permit formation of a vapor mixture containing relatively more nitric acid than otherwise. It would be advantageous to avoid the normal azeotrope formation in such a way as to permit formation of a vapor containing relatively more water than otherwise, as water vapors are considerably easier to handle and cheaper to evaporate. However, the dehydrating agents may be used in alternate steps in conjunction with the nitrates of this invention.

It is old to react KCl, NaCl or HCl to produce $Cl_2$, $KNO_3$ or $NaNO_3$ but the reaction proceeds very slowly toward completion and also forms NOCl with water vapors which provide serious corrosion problems. The NOCl may be withdrawn, $H_2O$ and $HNO_3$ vapors removed, and oxidized elsewhere to form $NO_2$ (used interchangeably herein with $N_2O_4$) and $Cl_2$ but this is an expensive and extra operation.

Moreover, in the past reactions similar to this have utilized a high grade chloride starting material. It is very desirable to have a process that can utilize not only high grade chlorides but commercial muriate of potash containing 95 to 97% KCl and up to 5% NaCl plus other impurities or sylvinite containing up to about 70% NaCl, 30 to 40% KCl and impurities, e.g., as mined in the Carlsbad, New Mexico, area of the United States or in Saskatchewan, Canada.

If it is desired to use strong $HNO_3$ as has been suggested, this becomes an expensive process, as conventional commercial $HNO_3$ does not go above the normal azeotropic composition (68% $HNO_3$).

Although hydrochloric acid is a by-product in many industrial processes and thus generally available at cheap prices, there has not been found an economically successful process for producing the more valuable elemental chlorine therefrom.

Therefore, it is an object of this invention to increase the $HNO_3$ concentration of $HNO_3$–$H_2O$ solutions at any range, but particularly from below to above the normal azeotropic composition.

It is also an object of this invention to remove water from $HNO_3$–$H_2O$ solutions with or without dehydrating agents.

It is likewise an object of this invention to establish conditions whereby the reaction of KCl, NaCl and/or HCl with $HNO_3$ to form $KNO_3$, $NaNO_3$ and/or $Cl_2$ may go readily to completion in a manner to eliminate chlorides in the early stages as far as equipment is concerned so that expensive corrosion-resistant equipment is not necessary in the later stages of the process.

It is an additional object of this invention to optionally produce strong $HNO_3$ within the chloride to chlorine process to be used in the basic reaction.

It is a further object of this invention to supply as starting material weak $HNO_3$ in stoichiometric quantities but to have both an excess and strong $HNO_3$ in the reaction zone.

It is another object of this invention to introduce weak $HNO_3$ into the first portion and strong $HNO_3$ into the final portion of the reaction.

It is likewise an object of this invention to divide the reaction zone into a gas reaction area in the absence of starting chlorides and a solution reaction area with chlorides with the strong $HNO_3$ being introduced and partially spent in the gas reaction area before passage to the solution reaction area.

It is an additional object of this invention to utilize readily available muriate of potash or sylvinite as a starting material if desired instead of the relatively more expensive high grade KCl or NaCl.

It is a further object of this invention, when starting with mixed chlorides of potassium and sodium to be able to produce separately the corresponding nitrates.

It is another object of this invention that the chloride be substantially completely reacted and then recovered as Cl₂.

It is likewise an object of this invention to utilize iron which is normally present in muriate of potash to minimize the corrosiveness of minor amounts of chloride ions that be left in the solution after removal of the Cl₂.

It is also an object of this invention that all of the nitrogen from the used HNO₃ ultimately be removed as KNO₃, NaNO₃ or mixtures if so desired but may be removed partially as NO₂ and/or strong HNO₃.

It is an object of this invention to produce elemental chloride cheaply from hydrochloric acid and in a process and equipment which may alternatively produce alkali nitrates from alkali chlorides or strong nitric acid.

It is a further object of this invention to produce elemental chlorine by oxidizing hydrochloric acid with nitric acid in such a manner that only air (for O₂) and hydrochloric acid need be consumed if so desired.

We have found that the nitrates of group Ia metals having an atomic weight at least as heavy as potassium, when dissolved in an aqueous solution of HNO₃ quite unexpectedly permit the production of a distinctly more concentrated HNO₃ in the solution by shifting the azeotropic point upwardly for HNO₃ (downwardly for H₂O), so that the resultant solution may become higher than 68% (conventional HNO₃–H₂O azeotrope) HNO₃ by mere boiling. Thus this azeotropic change results in a reduced vapor pressure of HNO₃ with added evaporation of water, the extent depending primarily on the concentration of the nitrate used but partly on the particular metal. The reduced HNO₃ pressure contrasts markedly with previously known compounds such as H₂SO₄, Mg(NO₃)₂ and others which have increased the HNO₃ pressure and reduced the H₂O pressure which lowers the azeotropic point for HNO₃. Use of these previously known compounds, however, may advantageously be combined in alternate steps with the nitrates described herein that have an opposite effect. Strong HNO₃ may be produced simultaneously while reacting KCl, NaCl or HCl with HNO₃ in the presence of an above specified nitrate and all or part of the strong acid recycled in the basic process for driving the reaction effectively to completion.

Consideration of the following reactions (in which Na may be substituted for K) are necessary to properly understand the overall chloride to chlorine process:

For K⁺ (potassium or sodium chloride)

(I) 12KCl + 12HNO₃ + 3O₂ → 12KNO₃ + 6Cl₂ + 6H₂O
(A) 12KCl + 24HNO₃
   → 12KNO₃ + 6Cl₂ + 12NO₂ + 12H₂O
(1) 12KCl + 16HNO₃
   → 12KNO₃ + 4Cl₂ + 4NOCl + 8H₂O

For H⁺ (hydrochloric acid)

(A) 12HCl + 12HNO₃ → 6Cl₂ + 12NO₂ + 12H₂O
(1) 12HCl + 4HNO₃ → 4Cl₂ + 4NOCl + 8H₂O

For both K⁺ and H⁺

(2) 4NOCl + 8HNO₃ → 2Cl₂ + 12NO₂ + 4H₂O
(B) 12NO₂ + 6H₂O + 3O₂ → 12HNO₃
(3) 18NO₂ + 6H₂O → 12HNO₃ + 6NO
(4) 6NO + 3O₂ → 6NO₂

Reaction (B) is the sum of reactions (3) and (4), (A) or (1) and (2), and (I) of (A) and (B). The only difference in the above reactions between the alkali chlorides and hydrogen chloride is in reaction (1) which, of course, results in differences in the cumulative reactions (I) and (A). This difference is simply the addition of 1 mole of HNO₃ per mole of KCl to provide NO₃⁻ for the recovered KNO₃. In regard to the KCl reactions, reaction (I) is the ultimate reaction obtainable in view of the fact that there is exhibited a 1:1:1 mole ratio between K⁺, NO₃⁻ and Cl⁻ on both sides of the equation, whereas reaction (A) requires 2 moles of starting NO₃⁻ per each one produced on the right and reaction (1) requires 4 moles of starting NO₃⁻ and 3 moles of starting Cl⁻ per 3 and 2, respectively, produced in desired form on the right. In regard to the HCl reaction, reaction (I) is the ultimate result obtainable, utilizing only O₂ (from the air) for the HCl oxidation but the O₂ is actually consumed indirectly in regenerating NO₂ (used interchangeably herein with N₂O₄) from NO.

We have developed an overall process as described by reactions (I), i.e., the ultimate theoretical effectiveness obtainable in converting KCl and/or NaCl and HNO₃ to KNO₃ and Cl₂, even when using sylvinite or muriate of potash or the oxidation of HCl merely with O₂ from the air with the aid of strong HNO₃ that need not be ultimately consumed. However, reaction (B) occurs outside the primary reaction zone and is used only if the NO₂ is not otherwise disposed of, e.g., as product per se. Reaction (A) may be used without (B) and (A) is driven to completion in the primary reaction zone, if proper conditions are utilized, and particularly if sufficient excess stoichiometric HNO₃ is used to effect about 40–65% HNO₃ in H₂O at the bottom of the reaction zone after reaction with the chloride (or muriate of potash) and dilution with reaction H₂O. A 54–60% acid concentration range in the bottoms has been found extremely advantageous but it can be reduced easily to about 50% and yet be commercially attractive. With less advantageous results from an economic and design standpoint, the range may extend from about 40 to 65%.

The reaction with HCl, in the absence of any nitrates or impurities such as iron that may be picked up in KCl and NaCl, preferably operates with 57–60% HNO₃ concentration at the end because of corrosion problems.

The reaction of NaCl with HNO₃ is faster and easier to drive to completion than KCl (and muriate of potash is even slower than technical KCl). Thus the excess stoichiometric quantities may be such to yield a concentration of HNO₃ at the reaction end of 30 to 40% for NaCl. However, concentrations and quantities should remain the same in the gas reaction area since no Na⁺, K⁺, or Cl⁻ is present there. Moreover, the solubility of NaNO₃ relative to KNO₃ is considerably less so that excess of acid and/or water may be necessary to hold the NaNO₃ in solution. As will be noted in this paragraph and also hereinafter, many properties of the sodium compounds differ surprisingly from the potassium compounds, leading to their easy separation herein if both are present and to surprising results from the effect of KNO₃ which markedly increases the HNO₃ content of the azeotropic composition of HNO₃–H₂O, whereas NaNO₃ lowers the HNO₃ content slightly.

It is preferred to add the outside source acid (stoichiometric quantity plus nominal processing losses) to the starting chloride material with at least a part of the acid sufficiently cooled to give a slurry having a temperature below about 60° as there is practically no reaction at or below this temperature level. Thus the slurry can be introduced into the closed system without giving off fumes that are harmful and disagreeable to personnel and equipment. Once the slurry is within the closed system, the heat will be raised to the appropriate level to support the reaction.

We have found it most advantageous to react for a relatively short period of time the chlorides and commercial HNO₃, in sufficient quantities and heat to dissolve the chlorides during which the reaction will proceed roughly from 40 to 80% completion without further aid. Thereafter, however, the reaction is advantageously carried out under such conditions so as to strip the reaction gases from the solution. Thus the solution is introduced into a second reaction area along with strong nitric acid where it is stripped of reaction gases.

The strong $HNO_3$ is formed in the process by evaporation of weak $HNO_3$ containing dissolved $KNO_3$, the latter changing the azeotropic composition. Evaporation is utilized also to recover $KNO_3$ and/or $NaNO_3$ crystals so that the mother liquor becomes strong $HNO_3$. Once the mother liquor has become strong $HNO_3$, it may be recycled as such or preferably as clean $HNO_3$ by distillation of vapors from the strong mother liquor. It is important that this second reaction area have separate zones, namely, a gas reaction zone where the off-gases may be reacted with the clean most concentrated $HNO_3$ to drive reaction (2) to completion (substantially eliminate NOCl from the system) and a liquid-reaction zone where the partially spent $HNO_3$ then reacts with the chloride solution.

We have found that the second reaction area should be carried out in a tower (preferably bubble plate column) to increase retention time with off-gases moving countercurrent to $HNO_3$ and the chloride solution. With this area divided into the two described zones, the countercurrent movement of the chloride solution only occupies a bottom portion of the column but $HNO_3$ moves throughout the entire length. Although a tower is preferred, any device which provides retention and countercurrent movement of the reactants could be used.

It will be appreciated that strong $HNO_3$, i.e., between 68 and 100%, may be produced as a by-product or main product of the processes herein. In view of the peculiar effect of certain nitrates on the azeotrope, it will be necessary when producing strong $HNO_3$ without KCl as a starting material, i.e., starting with NaCl or HCl only or operating without chlorides, to incorporate one of the nitrate salts of the metals in Group 1a having an atomic weight at least as heavy as potassium in the mother liquor circuit in order to produce strong $HNO_3$.

With the above objects and features in view, the nature of which will be more apparent, the invention will be more fully understood by reference to the drawings, the accompanying detailed description and the appended claims.

This invention as particularly illustrated in the drawings discloses complete processes for the production of industrial or agricultural grade $KNO_3$, $NaNO_3$, $Cl_2$, $NO_2$ and strong $HNO_3$, i.e., a higher concentration than "constant boiling" or normal azeotrope $HNO_3$ of about 68–69%. It will be appreciated, of course, as explained herein and as obvious to those skilled in the art, that various subprocesses of this complete process described may be practiced independently and further that there are many variable conditions that may be changed throughout the process by reason of different grades of starting materials available, end products desired, or various other factors dictated by economy, demand, etc.

Figure 1:
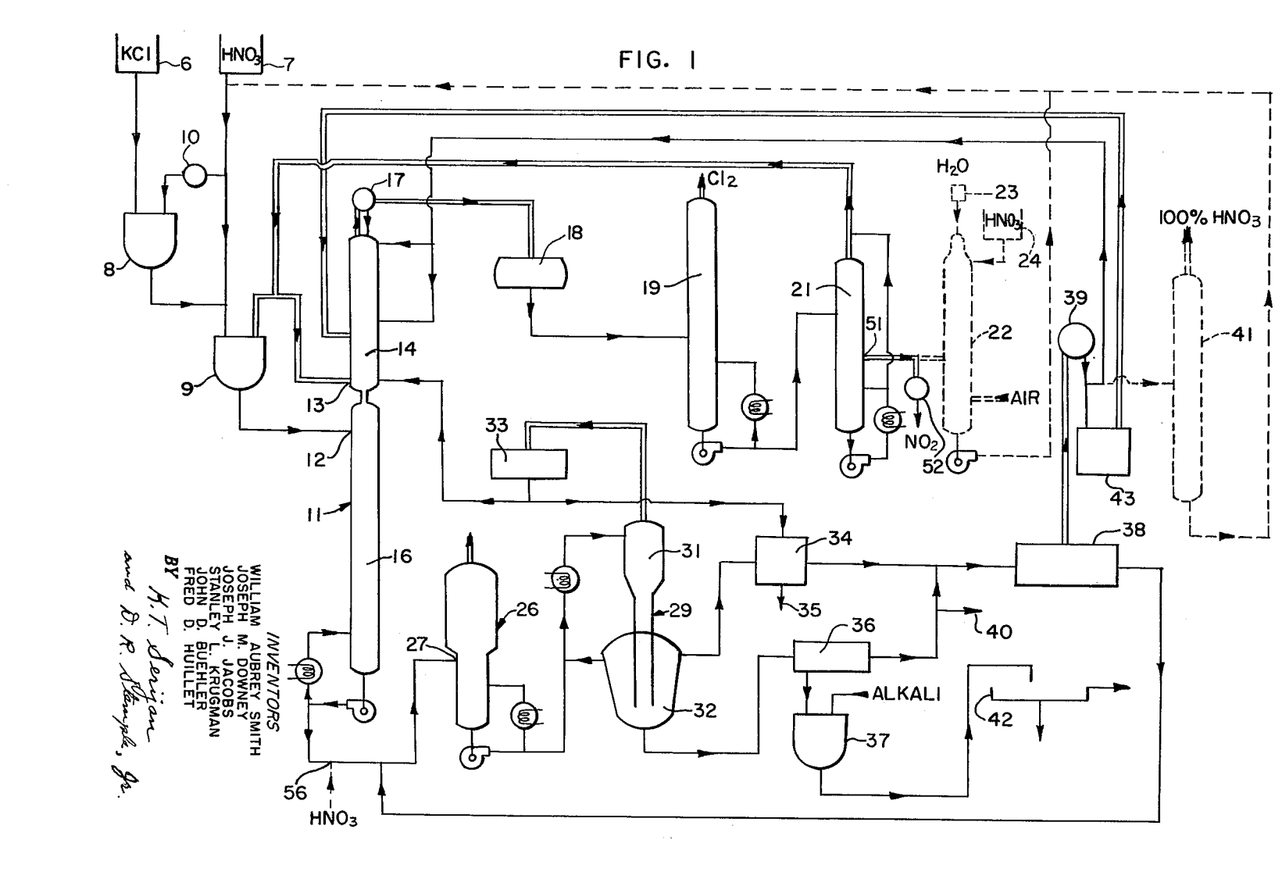
FIG. 1 is a diagrammatic flow sheet for conversion of KCl, $HNO_3$ and minor quantities of NaCl to $KNO_3$, $NaNO_3$ and $Cl_2$ in accordance with this invention (gas flows are shown in double lines and liquor or solids in single lines throughout)

FIG. 1 FLOW

Crude muriate of potash (approximately 96% KCl, 2.6 NaCl, 0.3 $MgCl_2$, $MgSO_4$, 0.17 polyhalite, 0.05 $Fe_2O_3$, 0.10 $Al_2O_3$, 0.23 acid insoluble and 0.25 $H_2O$) is stored in bin 6. Fresh weak $HNO_3$ of 55% concentration is stored in tank 7. Due to the fact that strong acid is produced in the system, weak acid of any strength may be the outside source of acid. In fact, the weak outside acid may also be fortified by $NO_2$ produced in the system. The acid is refrigerated at 10 and then sufficient quantity fed into the pulping tank 8 with potash to form a slurry up to about 70% solids which makes it convenient for further feeding control of the combined starting materials. The pulping tank is maintained at slightly negative pressure and below 60° F., preferably about 30° F. (all temperatures herein are Fahrenheit and pressures are atmospheric unless otherwise indicated) so as to substantially avoid reaction at this point. The temperature is controlled largely by the refrigeration of the acid.

The resultant slurry from pulping tank 8 is then fed into steam jacketed solution tank 9 where additional acid without refrigeration is fed from storage 7 (or other stages of the process), the total acid being sufficient so that substantially all solids go into solution. The temperature is maintained at about 150°. Under these conditions about 50% of the reaction takes place when the solids have been dissolved and it is preferred that the remainder of the reaction take place in the column, although 40 to 80% may be conveniently permitted in solution tank 9. The solution from tank 9 is then fed intermediate the ends into column reactor 11, which has several spaced trays. This tray column provides an extended period of time, e.g., 5 minutes for passage of the liquid down through the column which permits the reaction to go substantially to completion with a resultant complete stripping of the $Cl_2$ (and other gases) from the solution in the reactor. Thus all chlorides are removed in the column reactor except for the retention of an iron chloride complex as a contaminating factor but as will be explained hereinafter, for practical purposes, the processing of the primary liquid stream from this point on is generally free of the corrosion that normally accompanies chlorides in admixture with $HNO_3$.

The reaction mix or bottom liquid from tank 9 is introduced at an intermediate point 12 of column reactor 11. The reaction gases from tank 9 are introduced slightly above the liquids at point 13 which serves to divide column reactor 11 into an upper gas reaction zone 14 and a lower liquid reaction zone 16. Clean liquid $HNO_3$ of about 75% concentration is introduced near the bottom of the gas reaction zone, 85% $HNO_3$ vapors intermediate the ends and 85% clean liquid $HNO_3$ slightly above the vapors, all of which serve to oxidize any NOCl to $NO_2$ and $Cl_2$ in accordance with reaction (2). Some of the 85% liquid may be introduced at the top of the column as reflux. The acid (somewhat more dilute) will then, of course, pass into the liquid reaction zone 16 to react with KCl. It is preferred to use the acid at the higher concentration for reaction (2) and then at the resulting lower concentration for reaction (1) in the liquid reaction zone 16. To insure completion of reaction (2) in the gas reaction zone, it is necessary to use strong $HNO_3$ and preferably in sufficient excess to have strong acid remaining at the bottom of the gas reaction zone. Strong acid is shown entering zone 14 at three places which is desirable but not necessary. Other combinations and more or less entries may be used. In fact, the acid will be more concentrated toward the top of the zone [assuming sufficient excess present to overcome spending and dilution of acid by reaction (2)] when the highest entry plate has strong acid on it because the vapors from a strong acid solution are even more concentrated in $HNO_3$ and thus the series of plates and ultimately the condenser 17 above which refluxes the acid will give a stronger acid which will be 100% if there are sufficient plates. Conveniently, the $HNO_3$ concentration may be about 95% at the top and 70% at the bottom of zone 14.

For convenience, the upper trays of the gas reaction zone may be spaced above and separate from the lower trays of the liquid reaction zone as long as liquids pass from zone 14 into zone 16 and gases pass from zone 16 into zone 14. Actually as far as the reaction is concerned, solution tank 9 is part of the liquid reaction zone 16 and could be eliminated. However, it is preferred and more economical to complete at least about 40% of the reaction and to get solids into solution in the cheaper solution tank equipment rather than the expensive tower equipment. The provision of separate zones within the reaction column by introduction of KCl intermediate the column ends is an important feature of this invention and has the advantage of carrying out reaction (A) in one column or area and yet having reaction (2) carried out in a zone apart from the liquid reaction and with the strongest $HNO_3$ available to insure complete conversion of NOCl to $NO_2$ and $Cl_2$.

There is present in the entire reaction area sufficient stoichiometric quantity of acid necessary to complete the reaction and to maintain acid concentration preferably at 54–60% (for KCl) in the column bottoms, despite the spending and dilution thereof with the production of reaction water. The excess acid is provided and controlled by the rate of recycle, the net consumption of acid being only stoichiometric quantities, plus nominal processing losses. A relative high concentration of $HNO_3$ is made possible by the recycle of acid mother liquor with $KNO_3$ in solution which results in nitric acid at concentrations above the "constant boiling" 68–69% normally obtained. In fact, this recycle mother liquor when saturated with $KNO_3$ would appear to reach its azeotrope at above 90% $HNO_3$, depending on $KNO_3$ concentration and pressure. The acid mother liquor may be recycled per se but we prefer to recycle it at least in part as clean strong acid by vapor formation and condensation to thus avoid build-up of impurities in the reaction area and also to obtain, if desired, a stronger acid (by fractionation) than even the strong acid mother liquor.

The solution is fed to the column reactor at about 150° and the reboiler at the bottom of the reactor maintains a temperature of about 320°, with the off-gases coming off the top of the gas reaction zone at about 130 to 200° (the boiling temperature of 85 to 100% $HNO_3$). At these specified temperatures and concentration and quantity of acid, the reaction goes to completion and only $NO_2$ and $Cl_2$ come over in substantial quantity in the off-gases, the NOCl having been completely oxidized to the other two gases, by the excess $HNO_3$ in accordance with reaction (2).

The off-gases from the gas reaction zone, however, contain vapors of $HNO_3$ and $H_2O$ (possibly a trace only of NOCl) and are thus very corrosive. Accordingly, they are passed to the partial condenser 17 operating at a temperature of below about 70°, preferably 45 to 50°, to remove these vapors. Alternatively a direct contact chiller column may be used to countercurrently scrub the off-gases with cold $HNO_3$.

From the partial condenser 17 the dry gases are passed to a condenser 18 at about 35° and about 20 p.s.i.a. and then the liquid is passed to a fractionating tower 19 operating at about 55 p.s.i.a., with an overhead temperature of about 30° and a bottom temperature of about 122°. The $Cl_2$ overhead product is passed to a condenser (not shown) and then to storage as better than 99.9% $Cl_2$. The recovery of $Cl_2$ in the process is easily better than 97% of theoretical yield. In order to readily produce high purity overhead product, the $NO_2$ bottoms intentionally contain a few percent of $Cl_2$ along with the $NO_2$ and any trace of NOCl in the feed. The bottoms are pumped to the $NO_2$ fractionator 21 which operates at about 55 p.s.i.a., with an overhead temperature of about 45°, and a bottom temperature of about 124°. Pure $NO_2$ (99.99%) is the product of fractionator 21 withdrawn through vent 51 which is spaced sufficiently above the column bottom to be in the vapor zone and thus avoid any $HNO_3$ that may be in the condensed bottoms. A few percent $NO_2$ are taken with the overhead $Cl_2$ and NOCl in order to insure a high purity bottoms and all are recycled to the bottom of the upper zone 14 of the column reactor 11 along with a bleed portion from the column 21 bottoms.

The $NO_2$ product may be condensed at 52, be taken as an end product for various commercial uses or it may be taken to a standard $HNO_3$ absorption tower 22. Demineralized water is fed from receptacle 23 to the top, the $NO_2$ at the bottom, and fresh 55% $HNO_3$ from tank 24 is fed intermediate the ends but nearer the top. This 55% acid is the outside source feed acid, the concentration being that which is readily available on a commercial basis. However, any strength acid or only $H_2O$ could be used at this point. The tower 22 operates at about 155 p.s.i.a. Air for oxidation of $NO_2$ is supplied near the bottom by a compressor. Demineralized water is used for absorption at the top tray where the gas is lean in $NO_2$, and the 55% acid is fed on the appropriate tray. The resultant 65% acid product can be used in the process whenever clean weak acid is desired, particularly at tanks 8 and 9 as shown in dotted lines.

As will be apparent, the composition of the off-gases coming from the column reactor 11 may be made quite variable depending upon the conditions established in the reaction. The cycle set forth here to handle the off-gases, however, can handle a wide variation in the off-gas composition and, in fact, could be changed to produce NOCl at the expense of $Cl_2$ and $NO_2$ if that were desirable by taking gas directly from solution tank 9 without going through gas reaction zone 14, by using less concentrated and/or lesser quantities of $HNO_3$ in zone 14, or by making zone 14 relatively smaller (or eliminating) in comparison to liquid reaction zone 16.

Liquor is withdrawn from the bottom of column reactor 11 largely as a solution of $KNO_3$ in about 58% $HNO_3$ substantially free of chloride except for a minor amount tied up in an iron chloride complex which is not particularly harmful from a corrosive standpoint. Thus from this point on in the process the normally corrosive chlorides are of little concern and it is possible to consider stainless steel or similar equipment in the designing rather than glass lined or similar equipment that is normally required to this point, although hot strong $HNO_3$ is present downstream and must be considered in choice of materials and design (particularly temperatures and pressures) from the standpoint of corrosion.

It was thought that the iron present in commercial sylvite would create a contamination problem for a recycle process. Moreover, it was known that ionized chloride must be kept at a minimum beyond the column reactor if expensive equipment is to be avoided. It was found that a relatively stable (i.e., not ionized) and soluble iron chloride complex is formed. Iron other than the complex is soluble to at least 0.6% iron so that this amount of iron can be tolerated, and in fact, appears to aid the chloride problem at certain temperatures and acid concentrations. The chloride ion maximum is considered to be 0.06% but it normally runs from about 0.03% to a trace. The 0.6% soluble iron is more than enough to control the 0.06% maximum of chloride ion. If iron is not present in the starting sylvite, it may be added artificially at the bottom of column 11.

The recycle of a strong $HNO_3$ is carried out in either of two ways. If raw mother liquor is recycled to the reaction column, then impurities are a consideration in the reaction column 11, particularly where commercial muriate of potash or sylvinite is the starting material. However, it is preferred to distill the raw acid mother liquor and return clean $HNO_3$ only to the reaction column. If this is done, the build-up of impurities need only be considered in the smaller recycle path of the acid mother liquor as will be noted. The recycle of strong $HNO_3$ is only made possible by the production of raw acid mother liquor of greater strength than normal azeotropic acid which is an essential feature of this invention.

The 58% $HNO_3$ from the reactor column bottom is taken to the water removal column 26 where the water formed in the various reactions or otherwise introduced into the system is removed overhead by vaporization and the bottoms concentrated to about 80% $HNO_3$ or higher (in $H_2O$). Recycle acid mother liquor saturated at high temperature with $KNO_3$ and/or containing solid $KNO_3$ at lower temperatures may be added to the column 11 bottoms to obtain the desirable $KNO_3$ concentration on the feed plate. The overhead vapor, generally containing about 0.1% $HNO_3$ is condensed in a direct contact condenser, and demineralized water along with wash water from the filtration system is used for reflux. Caustic is injected in the direct contact condenser to neutralize the 0.1% acid. The 58% $HNO_3$ (containing dissolved $KNO_3$) is introduced at point 27 intermediate the ends of the column. The action in this column is controlled largely by the point of entry and concentration of the acid at this point because there is considerable difference in the column action above (fractionation) and below (stripping) the point of entry.

The 58% $HNO_3$ on the entry plate has $KNO_3$ dissolved therein which has raised the azeotrope point considerably above 68%. Accordingly vapors from the entering liquor will be considerably below 58% $HNO_3$, e.g., about 28% $HNO_3$ in the vapors if the solution contains about 80 parts $KNO_3$ and 10 parts $NaNO_3$ per 100 parts solvent ($NaNO_3$ reverses effect of $KNO_3$ to small degree), as the remaining solution tends to reach the higher than normal azeotrope point on evaporation. These vapors thus condense on the next upper plate at 28% acid, but with no $KNO_3$ in solution so that the acid on the upper plate and any thereabove have an azeotrope of 68%. The vapors from this condensed 28% clean acid will be about 5% $HNO_3$ and, of course, condense on the next plate. This continues until the overhead vapor is only 0.1% $HNO_3$ (or less, depending on column design), a part of which may be used as reflux instead of the demineralized $H_2O$ mentioned above. The 28% $HNO_3$ vapors from the feed plate are to be compared with about 40% $HNO_3$ vapors that would result from a 58% $HNO_3$ solution in $H_2O$ without any other dissolved material therein.

Thus the presence of $KNO_3$ in the $HNO_3$–$H_2O$ mixture permits a greater initial cut of water in the vapors and would be useful even if concentration of a weak acid to a stronger weak acid were the only goal.

When the 58% $HNO_3$ solution passes downward to the next plate, it will be considerably more concentrated, e.g., 65% as the result of the weak vapors having been removed. As relatively weak vapors are continually being removed, the concentration of $HNO_3$ gets higher and higher and goes above the normal 68% $HNO_3$ azeotrope, permitted as the result of the $KNO_3$ in solution. However, the bottoms cannot exceed the new or adjusted $HNO_3$ azeotropic concentration which depends on the amount of $KNO_3$ in solution. Generally with 58% acid feed and about 70 to 80 parts $KNO_3$ per 100 parts solvent, the bottoms are about 80% $HNO_3$ in the solvent portion. The adjusted azeotrope as the result of the presence of $KNO_3$ in the solution permits the first evaporation at the entry plate to be high in $H_2O$ and also the bottoms to be greater than 68% $HNO_3$. The solution introduced at point 27 accordingly must be such that the vapor yielded therefrom will have at least slightly less $HNO_3$ than the normal azeotrope of $HNO_3$ and $H_2O$ to thus permit fractionation of $H_2O$ from the column. Inasmuch as $KNO_3$ is in solution, the solution has a higher $HNO_3$ azeotrope and the $HNO_3$ concentration may be above normal azeotrope but yield a vapor of less than normal azeotrope and the vapor from the entry plate is the controlling factor. For example, an 80% $HNO_3$ in $H_2O$ with about 100 parts $KNO_3$ per 100 parts solvent gives a vapor of about 76% $HNO_3$. If this were condensed as clean 76% $HNO_3$ on the first plate above the feed plate, the vapors from the 76% $HNO_3$ (now clean with no $KNO_3$) would be even higher in $HNO_3$ as the clean strong $HNO_3$ solution would tend to go downward toward the 68% $HNO_3$–$H_2O$ azeotrope, and thus remove acid instead of water. The recycle of mother liquor to column 26 as shown on the drawing may be introduced anywhere between the bottoms of columns 11 and 26 where $KNO_3$ is in solution to give more efficient stripping by raising the ratio of $KNO_3$ to $HNO_3$ on the trays which raises the azeotrope and favors $H_2O$ in the vapor composition.

The water removal column could easily be divided into two separate columns of units representing the upper fractionation and lower stripping sections as long as there was passage from the bottom of the former to the top of the latter. With separate heating means for the divided units, there would be greater flexibility in operation. Obviously, the reflux ratio coming into the stripping section must be kept as low as possible to increase the acid strength at the bottom.

The 80% $HNO_3$ from the water removal column bottoms is fed at 290° to the crystallizer-evaporator 29 which has an upper vacuum flash chamber 31, operated under vacuum to give a temperature of about 150°, to which the water column bottoms are fed, and a lower atmospheric suspension chamber 32 from which crystals in a slurry are drawn off the bottom as they settle while mother liquor is recycled from near the top to the upper chamber. Overhead vapor (somewhat less than the feed e.g., 75% $HNO_3$) from the crystallizer is condensed in a surface condenser 33, and a secondary vent condenser is used to reduce acid losses. A two-stage jet and barometric condenser system provides vacuum for the system. The crystals are thus created by both cooling and evaporation and their size is better than 80% plus 20 mesh. The condensed clean 75% acid is fed to the gas reaction zone 14 near the bottom at a point where the acid concentration in the column is at or about 75%.

There is a secondary suspension of fine salts in the crystallizer which is removed as an overflow stream and contains $NaNO_3$, $KNO_3$ and sometimes $Mg(NO_3)_2$, $Ca(NO_3)_2$ and insoluble impurities (depending upon amount of impurities bleed and whether the salts at this point exceed their solubility), all of which are pumped to a settling cone. The controlled crystallization forms big crystals of $KNO_3$ by growing from small seed nuclei to large crystals. The temperature differential across chamber 31 controls the formation of $KNO_3$ seed nuclei. However, since the $NaNO_3$, $Mg(NO_3)_2$, and $Ca(NO_3)_2$ are in such relatively small proportions to $KNO_3$, there is no appreciable growth and these crystals may be removed largely as fines in the overflow stream.

The liquid from the cone is recycled to the crystallizer and the thickened slurry flows by gravity to an agitator tank 34 where 75% $HNO_3$ is added to dissolve $KNO_3$ fines. It may be desirable to filter before dissolving the fines to take off the mother liquor. The dissolving of $KNO_3$ from $NaNO_3$, $Ca(NO_3)_2$, and $Mg(NO_3)_2$ is made possible by the extreme solubility of $KNO_3$ in strong $HNO_3$ relative to the much lower solubility of $NaNO_3$ (see FIG. 3). $Ca(NO_3)_2$ and $Mg(NO_3)_2$ are not shown in the figure but are not more soluble than $NaNO_3$. The resulting slurry is filtered and the cake removed at 35 as product (if sufficient $NaNO_3$, it may be processed for recovery) or alternatively discarded. The Fe level has been concentrated to about 0.7% (range from 0.5 to 3.0%) in the water balance column and the crystallizer. Large crystals are removed continuously from the crystallizer and passed through filter 36 where they are washed with $H_2O$ to a low level $HNO_3$ content. A liquid bleed 40 is taken (and used as product, if desired) preferably immediately after filtration to control impurities in the circulating mother liquor as the $KNO_3$ is at its lowest point relative to impurities.

The acid mother liquor which is saturated with $KNO_3$ at 150° may be recycled to the reaction column 11, as pointed out before, or may be treated in one or both of two methods (along with 75% acid used to dissolve $KNO_3$ fines at agitator tank 34). This mother liquor which is saturated with $KNO_3$ has reached an acid concentration of about 83–87% and is taken to vaporizer 38 from which about 81–85% $HNO_3$ vapors will be boiled off at reduced pressure and about 150–160° (or at atmospheric pressure at about 220°) leaving a slurry of $KNO_3$ (or a rich solution at 220°) which is then recycled to the water removal column 26. Evaporators 31 and 38 could be reversed or combined into a single evaporation step but the two stages as shown are preferred. In operating 38 at a considerably higher temperature, a more concentrated $HNO_3$ is obtained but the corrosion problem is also greater at the higher temperature. The temperature in either instance is generally at the boiling point which is controlled by the operating pressure.

The 85% $HNO_3$ vapors are passed to a condenser 39 and then a portion of the condensed acid to heater 43 to form vapors. Then vapors and liquid 85% $HNO_3$ are fed to the reaction column 11 as previously described. As an alternative, some of the vapors or condensate may be fed to a fractionator 41 where 100% $HNO_3$ is taken overhead and 68% $HNO_3$ (normal azeotropic composition of acid in absence of $KNO_3$) at the bottom. The 100% $HNO_3$ (now clean acid, having been distilled) will generally be recycled to storage tank 7, water removal column 26, or column reactor 11, although it may be utilized at various other points in the process. The condensate from 39 may be completely vaporized by heater 43 and pass only vapors to reaction column 11 or fractionator 41, in either case, the heat of the vapors being used to fractionate $HNO_3$ in the respective column.

It will, of course, be appreciated that production of 100% $HNO_3$ is an alternative in the process and depending upon relative demand for strong $HNO_3$ and $KNO_3$ it is possible to produce from the process only strong $HNO_3$, only $KNO_3$, or both, and in fact, a solution of $KNO_3$ in $HNO_3$ may also be produced if desired. Such a solution would be particularly useful in fertilizer applications, as it would provide nitrate, potassium and acidulation value. If strong $HNO_3$ is to be withdrawn from the cycle as product, a corresponding amount of weak $HNO_3$ could be introduced most anywhere in the process but preferably at 56 to the column 11 bottoms. Moreover, it naturally follows that the sub-processes for producing each of these compounds may be practiced apart from the overall process in its entirety, e.g., 100% $HNO_3$ may be produced by adding $KNO_3$ to dilute $HNO_3$ and following the process from the water removal column to the fractionator 41, with recycle of the $KNO_3$.

The solids from filter 36 are discharged to repulp tank 37 where they are slurried with neutral liquor (saturated with $KNO_3$ and containing dissolved impurities) and sufficient dilute alkali (preferably NaOH) for neutralization of small amounts of residual acid. This slurry is pumped to a screen 42 for separation of the plus 20 mesh for agricultural product and minus 20 mesh for industrial product. The division by sizing has no bearing particularly on $KNO_3$ purity but is done because fertilizer producers want coarse material, whereas industrial $KNO_3$ is preferred as a finer material.

The agricultural product is filtered and washed to 0.5% $NaNO_3$ with saturated $KNO_3$ liquor, then dried to about 0.3% moisture content and conveyed to storage. The agricultural product can run up to 99% $KNO_3$ with about 0.6% $NaNO_3$ and miscellaneous impurities.

The industrial product is filtered and washed to 0.1% $NaNO_3$ and miscellaneous impurities, dried to about 0.3% moisture content and conveyed to storage. Thus the industrial product is 99.6% $KNO_3$ and 99.9% $KNO_3$ if $H_2O$ is disregarded.

Obviously, the end product may be proportioned differently between industrial and agricultural grades, and, in fact, may be all one or the other. The crystallizer can be adjusted to secure finer material for industrial grade or the fines may be recycled to secure a higher percentage of coarse agricultural grade.

As an alternative, the crystals may be removed only at the bottom of suspension tank 32 (i.e., without an overflow removal of fines), in which case there will be from 3 to 5% $NaNO_3$ therein and some entrained $HNO_3$. This will be slurried and passed directly to repulper 37 and the entrained acid neutralized with NaOH to form additional $NaNO_3$. This slurry can be passed to screen 42 and the oversize will have sufficient purity for agricultural product. The undersize will be taken to a settling cone from which the thickened slurry is removed and passed to a base exchange dissolver where KCl is added, whereby the $NaNO_3$ reacts to form NaCl and $KNO_3$. The resulting solution is filtered to remove any solid impurities. The solution is evaporated at an elevated temperature, at which point $KNO_3$ is much more soluble than NaCl and the latter is precipitated at the high temperature. The mixture is filtered while hot water added to the filtrate and the filtrate cooled, $KNO_3$ crystals thus forming but NaCl remaining in solution. The $KNO_3$ crystals are filtered for industrial grade product of 99.9% purity and the mother liquor recyled to the base exchange dissolver.

Another alternative is to neutralize with KOH which will eliminate all $NaNO_3$ except that from the original NaCl in the sylvite. However, KOH is relatively expensive and some $NaNO_3$ remains.

A further alternative is to neutralize with $NH_4OH$, thus giving a mixture in solution of $NH_4NO_3$, $KNO_3$ and $NaNO_3$. This is possibly marketable per se as a fertilizer. The solution could be chilled to 0° to precipitate the $KNO_3$ and $NaNO_3$ as only 4% and 3%, respectively, would remain in solution, leaving primarily $NH_4NO_3$.

Figure 2:
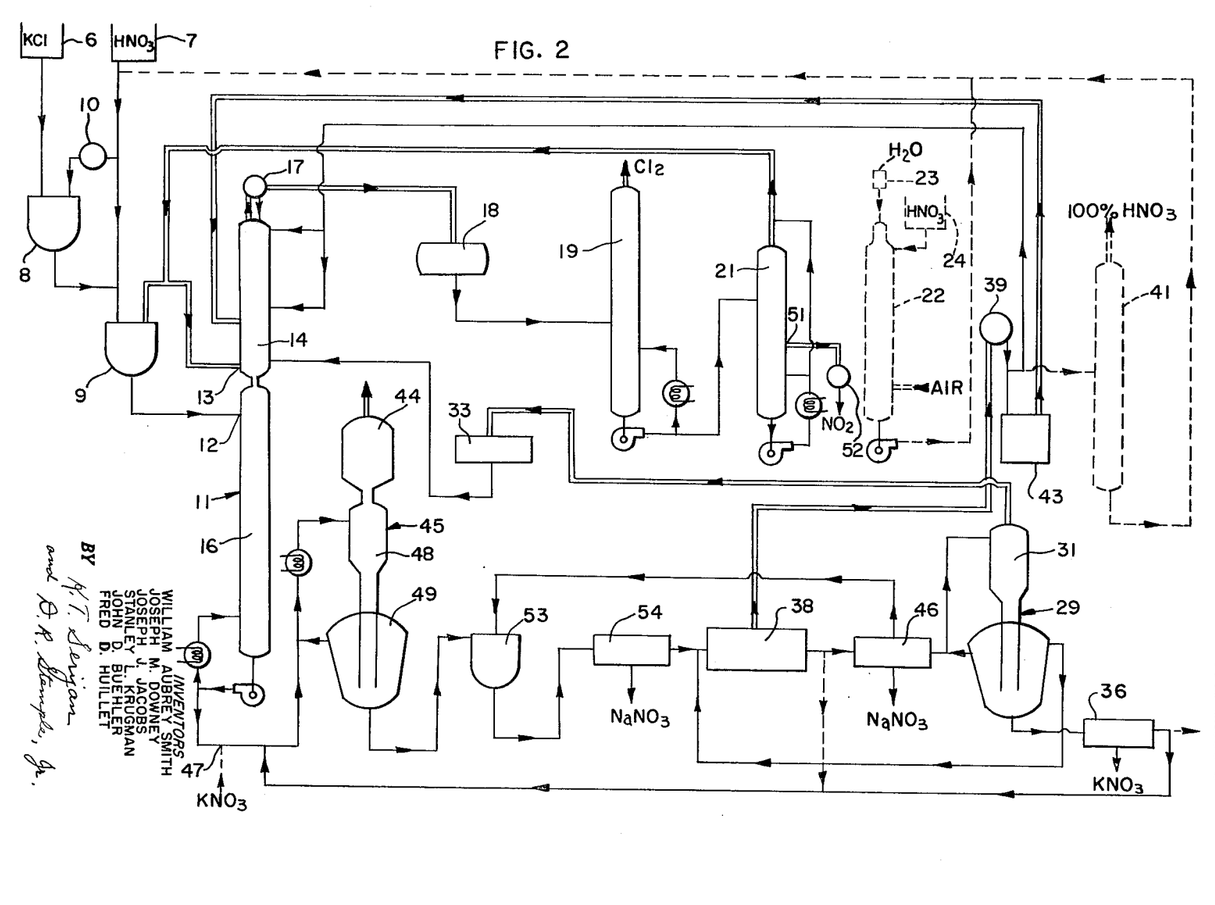
FIG. 2 is a diagrammatic flow sheet when starting with substantial quantities of both KCl and NaCl.

FIG. 2 FLOW

Figure 3:
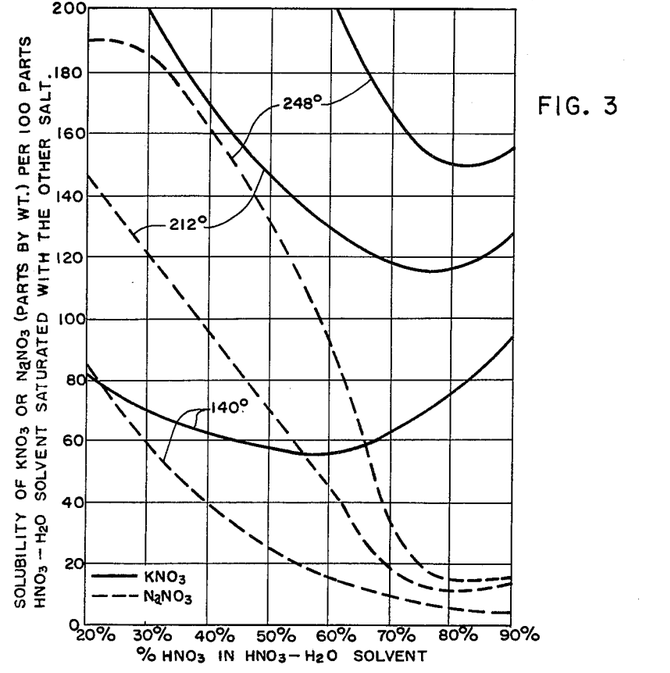
FIG. 3 is a graph showing the solubility of $KNO_3$ and $NaNO_3$ in the saturated presence of each other at various temperatures and concentrations of $HNO_3$.

The description heretofore of the flow demonstrated by FIG. 1 is primarily for a KCl starting material with relatively small amounts of NaCl as impurity. If, however, there were substantial quantities of NaCl in the starting material, e.g., sylvinite, it would be desirable to follow the flow sheet as outlined in FIG. 2. As shown in FIG. 3, the solubility of $NaNO_3$ is much less than $KNO_3$ in hot, strong $HNO_3$. Therefore, there is apt to be a slurry with solid $NaNO_3$ in the water removal column if substantial NaCl was present in the starting material. Accordingly, column 11 bottoms are passed to the water removal column 45 which has above the entry point a top column portion 44 similar to the top portion of the water removal column 26. Below the point of entry, however, is a crystallizer-evaporator having an upper flash chamber 48 and a lower suspension chamber 49. Overhead vapors pass into the fractionation column 44 while a slurry of $NaNO_3$ crystals is strong $HNO_3$ is removed at the bottom. Mother liquor from the suspension chamber 49 is recycled to the entry point. Various other units could be used below the fractionator portion 44 as long as evaporation takes place and the nitrates are not permitted to clog the flow.

The slurry from the bottom of suspension chamber 49 is taken to pulp tank 53 and slurried with recycle liquor from filter 46 which is saturated with $NaNO_3$ and contains $KNO_3$ below saturation. The slurry is then passed to filter 54 and the $NaNO_3$ crystals removed as product, after which the filtrate is passed to evaporator 38. Strong acid vapors would be taken from here just as in FIG. 1 for recycle to column reactor 11 and/or fractionator 41.

The liquor from evaporator 38 will be strong $HNO_3$ slurry of $NaNO_3$ crystals and $KNO_3$ in solution almost to saturation. The slurry is passed to filter 46 for removal of additional $NaNO_3$ and the filtrate passed to the crystallizer evaporator 29 for the controlled crystallization of $KNO_3$. $NaNO_3$ fines and other fine impurities would be taken off the top of chamber 32 as before but this time recycled to evaporator 38. The $KNO_3$ crystals would be withdrawn and filtered at 36 and treated thereafter as before. The mother liquor, saturated with $KNO_3$, will preferably be recycled to the water removal column.

Various ways of separating $KNO_3$ from $NaNO_3$ will become apparent due to solubility differences both as a result of temperature of the solute and concentration of $HNO_3$ in the solute, e.g., the solution might be quickly cooled between the reaction column 11 bottom and entry into the water removal column and the resultant precipitated $NaNO_3$ removed.

If there is no KCl in the starting chloride material, the evaporator crystallizer 29, filter 36 and filter 46 will be eliminated so that the liquor or slurry will be recycled directly after evaporator 38 to column 11 bottoms (as shown in dotted line). In such a system, however, it will be necessary to add $KNO_3$, $CsNO_3$ or $RbNO_3$ to the solution before entry into the water removal column 26. Such a nitrate would be recycled by the liquor return to column 11 bottoms and entry of a small amount thereof to provide for processing losses could be made at any point in the cycle and shown here at point 47. It is, of course, essential that $KNO_3$, $CsNO_3$ or $RbNO_3$ be in the solution where $HNO_3$ is to be concentrated above the normal $HNO_3$–$H_2O$ azeotrope. Whereas $KNO_3$, $CsNO_3$ or $RbNO_3$ is an essential feature of the invention, $NaNO_3$ is not and thus if high grade KCl is used without any NaCl, the process will follow through practically the same as shown in FIG. 1 but without the removal of $NaNO_3$ cake.

FIG. 3

FIG. 3 is a graph demonstrating the saturated simultaneous solubility of $KNO_3$ and $NaNO_3$ in varying concentrations of $HNO_3$–$H_2O$ solvent at various temperature levels. The solubility of $NaNO_3$ rapidly decreases in greater concentrations of $HNO_3$ and levels off at above about 70% $HNO_3$ at less than 20 parts per 100 solvent, regardless of temperature, whereas the solubility of $KNO_3$ decreases slowly in increased $HNO_3$ concentration for a certain range, depending on the temperature, and thereafter the solubility rapidly increases as 100% $HNO_3$ is approached.

Figure 4:
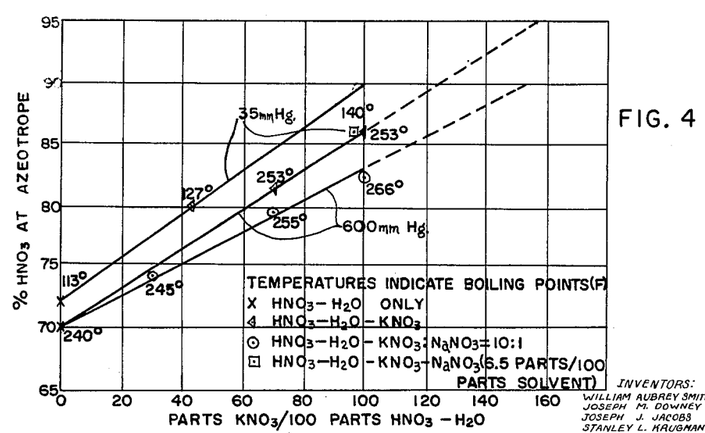
FIG. 4 is a graph showing the effect of varying amounts of $KNO_3$ alone and with $NaNO_3$ on the azeotropic composition of $HNO_3$ and $H_2O$.

FIG. 4

FIG. 4 is a graph demonstrating the effect of $KNO_3$ in solution on the azeotrope point of the $HNO_3$–$H_2O$ solvent. "Azeotrope point" as used herein means the $HNO_3$ concentration of the $HNO_3$–$H_2O$ solvent at the constant boiling point of a given mixture which may have other compounds dissolved in the $HNO_3$–$H_2O$ solvent. Thus, the normal azeotrope point of $HNO_3$–$H_2O$ only at atmospheric pressure is about 68% $HNO_3$. $NaNO_3$ in the solution will lower the azeotrope point and when present with $KNO_3$ partly cancels the effect of the $KNO_3$. The effect of $KNO_3$ alone and in conjunction with 10% $NaNO_3$ has been plotted at about 600 mm. of mercury pressure, which shows the lowering effect of $NaNO_3$. At 35 mm. pressure, the example with $NaNO_3$ present falls below the straight line drawn through the points without $NaNO_3$. The 140° B.P. at 35 mm. pressure represents a solution of $HNO_3$–$H_2O$ saturated with both $KNO_3$ and $NaNO_3$ so that the 35 mm. line is not plotted even in dotted lines beyond 100 parts of $KNO_3$ in the solvent.

At high $HNO_3$ concentrations, only relatively small amounts of $NaNO_3$ are soluble, as will be noted from FIG. 3. In any event, even if $NaNO_3$ were present in amounts equal to $KNO_3$, the lowering effect of $NaNO_3$ does not equal by far the raising effect of $KNO_3$. As shown in FIG. 4 (in dotted lines representing laboratory work not reduced to specific results), $HNO_3$–$H_2O$ saturated with $KNO_3$ can have an azeotrope point of better than 90% $HNO_3$, the ceiling having not yet been determined, depending on the boiling point, which controls the solubility of $KNO_3$, and is a function of the pressure. At any given concentration of $KNO_3$, the azeotrope will be higher as the pressure is reduced. However, in view of the fact that higher pressure causes higher boiling points and thus higher concentrations of $KNO_3$ to reach saturation, the ultimate high azeotrope obtainable is at higher pressures.

By distilling $HNO_3$ and $H_2O$ at a pressure and temperature and from a point in the process such that the liquor is nearly saturated or at least rich with $KNO_3$, $CsNO_3$ or $RbNO_3$, there are produced some totally unexpected benefits. One skilled in the art would assume that such water soluble nitrates would decrease the vapor pressure of water over a boiling solution of $HNO_3$, $H_2O$ and the nitrate. One would, therefore, expect that the vapors would be richer in $HNO_3$ at the same temperature and pressure than they would be if no such nitrate were dissolved in the liquor. As a matter of fact, the vapors are substantially richer in water than they would be otherwise. A definite theory to explain this behavior is not known, but it may be that there is a tendency for these specific nitrates and $HNO_3$ to associate in the rich solutions.

There are many incidental benefits to utilizing this unique property. For one thing, less $HNO_3$ has to be distilled or evaporated to remove a unit quantity of water for water balance. Therefore, less heat energy is required to remove a unit quantity of water since less latent heat is provided for $HNO_3$. Fractionation is also easier since water can be removed from a more dilute solution with fewer plates in the fractionator (or less reflux).

One of the best effects, however, is in increasing the concentration of acid in the acidic mother liquor which is used for recycle per se or after distillation. In simple $HNO_3$–$H_2O$ solutions, the highest concentration which can be attained by simple evaporation is the azeotropic mixture (about 68% at atmospheric pressure). Because of the effect of the specified nitrate and its tendency to bind the $HNO_3$ in solution and reduce its vapor pressure, however, much higher $HNO_3$ concentrations can be produced. Depending upon the amount of $HNO_3$ and $H_2O$ in the original reactor bottoms (and this can be varied at will by the amount of excess acid used with the recycle), the $HNO_3$ concentration in the mother liquor may go easily as high as 85% or even higher. This increased acid concentration at above normal azeotrope has a very beneficial effect in the column reactor since reactor is a function of the concentration of acid used. Recycling of this very strong acid mother liquor or fresh acid distilled therefrom, allows maintenance of high concentrations in the reaction column and to thus produce more complete conversions, particularly of NOCl and more rapid reaction.

Figure 5:
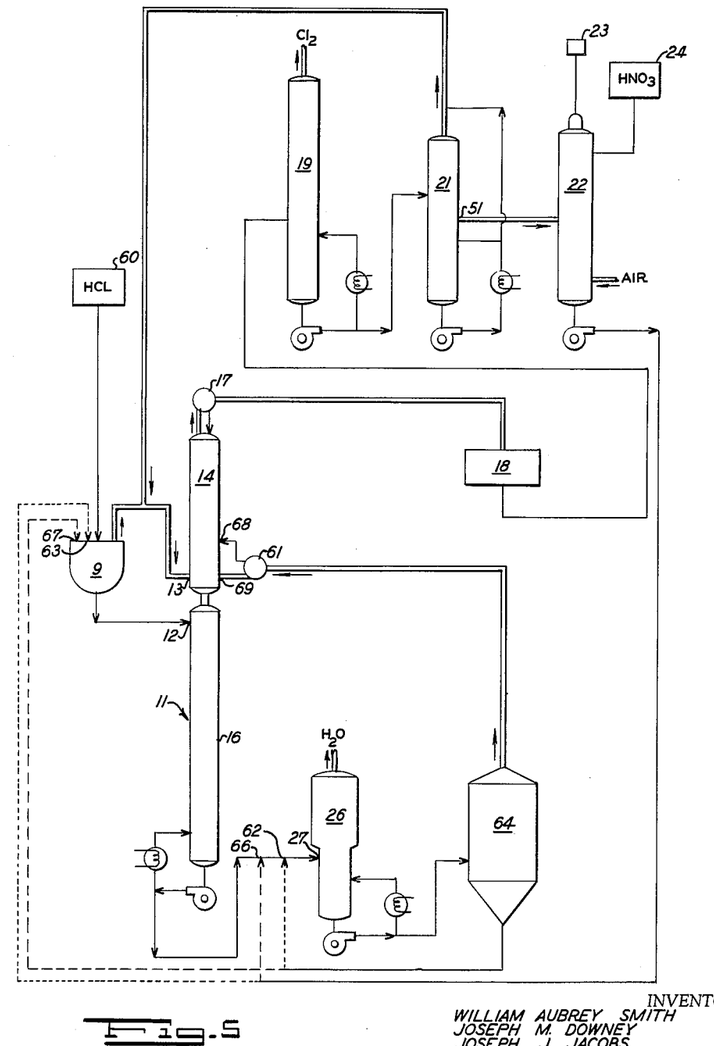
FIG. 5 is a diagrammatic flow sheet for oxidation of HCl to $Cl_2$ with $HNO_3$ (modifications shown in dot or dash lines)

FIG. 5 FLOW

Ordinary commercial 32% HCl (may be any concentration) is stored at 60 and fed into solution tank 9 along with $HNO_3$, the source of which is by alternate routes to be discussed later. The combined HCl–$HNO_3$ solution from tank 9 is fed intermediate the ends at point 12 into the column reactor 11. The reaction gases from tank 9 are introduced slightly above the liquids at point 13. Clean 80% $HNO_3$ from partial condenser 61 is introduced into zone 14 at entry point 68 for the liquid and at 69 for the vapors. The treatment and action of off-gases from zone 14 through column 21 are identical to that in FIGS. 1 and 2 which will not be repeated here.

The solution is withdrawn from the bottom of column reactor 11 largely as a 60% $HNO_3$ solution substantially free of chlorides and taken to the water removal column 26. However, $KNO_3$ (or $CsNO_3$ or $RbNO_3$) is introduced to the system prior to column 26 as at 63 (in tank 9). The bottoms of column 26 are fed to a non-salting evaporator 64 which produces clean strong $HNO_3$ vapors overhead and strong $HNO_3$ solution containing dissolved $KNO_3$ as bottoms for recycle to provide $KNO_3$ on the entry plate of column 26. The preferred method is that shown in dash lines where the mother liquor is returned to solution tank 9 at point 63 as the $KNO_3$ in solution has some effect to lessen corrosion through the system. In this event, the clean weak $HNO_3$ from tower 22 is recycled into the system at point 66 just prior to column 26. However, if the $KNO_3$-$HNO_3$ solution is recycled at 62 (as shown in dotted lines) to the water removal column, then the clean weak $HNO_3$ from tower 22 is taken to the solution tank 9 at point 67 (as shown in dotted lines). In other words, the entry of the $KNO_3$-$HNO_3$ solution and the clean weak $HNO_3$ may be reversed and obviously other points of entry or combinations may be utilized, bearing in mind that $HNO_3$ from some source is essential in column 11 and $KNO_3$ is essential in the lower stripping section of column 26.

FIG. 5—EXAMPLE 1

In the preferred flow shown, i.e., where the $KNO_3$-$HNO_3$ solution is recycled to the solution tank 9 as shown in dash lines, 100 parts HCl (plus 210 parts $H_2O$) at 32%, 440 parts $HNO_3$ (plus 110 parts $H_2O$) at 55% and 1100 parts $KNO_3$ were fed to tank 9 and passed to column 11, resulting in 65 parts $Cl_2$ and 60 parts NOCl passing into zone 14. 440 parts of $HNO_3$ (110 parts $H_2O$) at 55% were added to zone 14 which resulted in 97 parts of $Cl_2$ and 126 parts of $NO_2$ passing over as off-gases and 325 parts $HNO_3$ (75 parts $H_2O$) at 72% flowing down to zone 16. 710 parts $HNO_3$ (480 parts $H_2O$) at 60% and 1100 parts $KNO_3$ passed from column 11 to column 26 to which was added 172 parts of $HNO_3$ (140 parts $H_2O$) at 55% at point 66. From the bottom of column 26 to evaporator 64 was passed 880 parts $HNO_3$ (220 parts $H_2O$) at 80% and 1100 parts $KNO_3$. From the top of evaporator 64 passed the 440 parts $HNO_3$ and 110 parts $H_2O$ fed into zone 14 and from the bottom the 440 parts $HNO_3$, 110 parts $H_2O$ and 1100 parts $KNO_3$ fed into tank 9 at 67.

FIG. 5—EXAMPLE 2

In the other flow modification shown, i.e., where the $KNO_3$-$HNO_3$ solution is recycled to the water removal column as shown in dotted lines, 100 parts HCl (210 parts $H_2O$) at 32% and 172 parts $HNO_3$ (140 parts $H_2O$) at 55% were fed to tank 9 and passed to column 11, resulting in 65 parts $Cl_2$ and 60 parts NOCl passing into zone 14. 970 parts $HNO_3$ (240 parts $H_2O$) at 80% were added to zone 14 which resulted in 97 parts $Cl_2$ and 126 parts $NO_2$ passing over as off-gases and 850 parts $HNO_3$ (260 parts $H_2O$) at 77% flowing down to zone 16. 970 parts $HNO_3$ (645 parts $H_2O$) at 54% passed from column 11 to column 26 to which was added 970 parts $HNO_3$ (240 parts $H_2O$) at 80% and 2400 parts $KNO_3$ at point 62. From the bottom of column 26 to evaporator 64 was passed 1935 parts $HNO_3$ (485 parts $H_2O$) at 80% and 2400 parts $KNO_3$. From the top of evaporator 64 passed the 970 parts $HNO_3$ (240 parts $H_2O$) at 80% which was fed into zone 14 and from the bottom the 970 parts $HNO_3$ (240 parts $H_2O$) at 80% and 2400 parts $KNO_3$ fed into column 26.

FIGS. 6 TO 9

As has been pointed out in regard to previous figures, it is possible to merely concentrate $HNO_3$ as the main product and ignore the conversion of the various chlorides. Furthermore, it has been found that any nitrate salt of the metals in group Ia having an atomic weight heavier than potassium may be substituted for potassium nitrate in the process for concentrating nitric acid as described in FIGS. 1 to 5. Moreover, solutions of other metal nitrates that behave as dehydrating agents may be used in alternate steps in conjunction with the above defined nitrates to aid nitric acid concentration.

Figure 6:
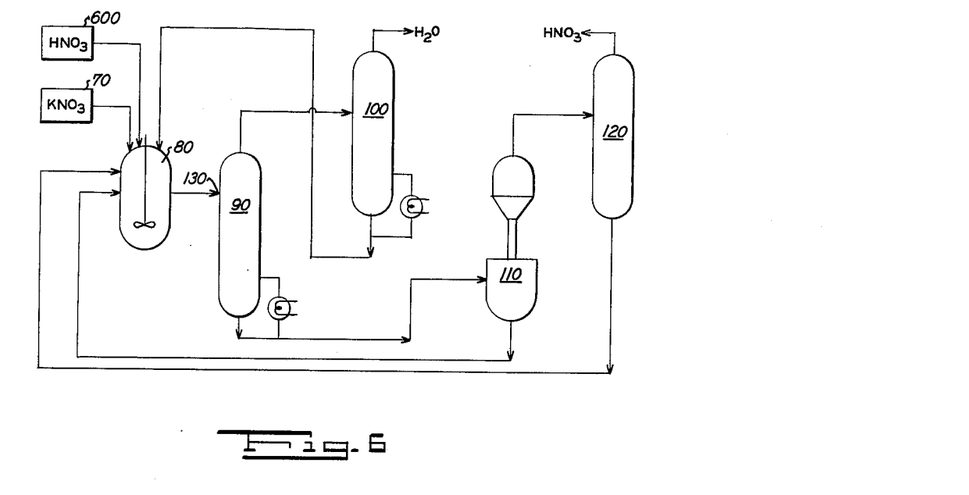
FIG. 6 is a diagrammatic flow sheet showing the concentrating of $HNO_3$.

FIG. 6 FLOW

As shown in FIG. 6, fresh weak $HNO_3$ of 55% concentration is stored in tank 600 and solid $KNO_3$ in bin 70 and both are fed into dissolving tank 80 in the proper amounts to maintain about 50 parts $KNO_3$ to 100 parts solvent in the dissolving tank 80. After mixing and dissolving the solution from dissolving tank 80 is fed to the water stripper column 90 for boiling. The overhead vapors from stripper 90 are passed to water rectifier column 100 wherein fractionation occurs to give an overhead of less than 1% $HNO_3$ and a bottom stream of about 65% $HNO_3$ which is cycled back to the dissolving tank 80.

The effectiveness of column 100 is influenced by the concentration of acid at the point of entry 130 into column 90 (this point of entry would be the intermediate feed point if columns 90 and 100 were combined) because there is considerable difference above (fractionation) and below (stripping) the point of entry 130. The functions of columns 90 and 100 can be accomplished in one column by feeding intermediate the column ends, but it is preferred to have two columns and select different materials, sizes, rates, and other conditions according to the different circumstances presented. It will be appreciated that the liquid in column 100 is clean $HNO_3$-$H_2O$ and is merely being fractionated, whereas the liquid in column 90 is a solution of $KNO_3$ in the $HNO_3$-$H_2O$ solvent which is being boiled to concentrate the $HNO_3$ and the $KNO_3$.

The 55% $HNO_3$ at the entry point has $KNO_3$ dissolved therein which has raised the azeotrope point considerably above 68%. Accordingly, vapors from the entering liquor will be considerably below 55% $HNO_3$, e.g., about 28% $HNO_3$ in the vapors if the solution contains about 50 parts $KNO_3$ per 100 parts solvent, as the remaining solution tends to reach the higher than normal azeotrope point on evaporation. These vapors thus condense on the next upper plate (i.e., in column 100) at 28% acid but with no $KNO_3$ in solution so that the acid on any plates in column 100 has an azeotrope of 68%. The vapor from this condensed 28% clean acid will be about 5% $HNO_3$ and, of course, condense on the next plate. This continues until the overhead vapor is only 0.1% $HNO_3$ (or less, depending on column design) a part of which may be used as reflux if desired. The 28% $HNO_3$ vapors at the feed plate are to be compared to about 42% $HNO_3$ vapors that would result from a 55% $HNO_3$ solution in $H_2O$ without any other dissolved material therein. Thus, the presence of $KNO_3$ in the $HNO_3$-$H_2O$ mixture permits a greater initial cut of water in the vapors and would be useful even if concentration of a weak acid to a stronger weak acid were the only goal.

When the 55% $HNO_3$ solution passes downwardly to the next plate in column 90, it will be considerably more concentrated, e.g., 63% as the result of the weak vapors having been removed. As relatively weak vapors are continually being removed, the concentration of $HNO_3$ gets higher and higher and goes above the normal 68% $HNO_3$ azeotrope permitted, as a result of the $KNO_3$ in solution. However, the bottoms cannot exceed the new or adjusted $HNO_3$ azeotropic concentration which depends upon the amount of $KNO_3$ in solution. Generally, with 55% acid feed and about 50 parts $KNO_3$ per 100 parts solvent, the bottoms are about 80% $HNO_3$ in the solvent portion and 65 parts $KNO_3$ per 100 parts solvent. The adjusted azeotrope as a result of the presence of $KNO_3$ in the solution permits the first evaporation at the entry plate to be higher in $H_2O$ and also the bottoms to be greater than 68% $HNO_3$.

The solution introduced at the entry point 130 accordingly should be such that the vapor yielded therefrom will have at least slightly less $HNO_3$ than the normal azeotrope of $HNO_3$ in $H_2O$ to thus permit fractionation of $H_2O$ from the column 100. Inasmuch as $KNO_3$ is in solution, the solution has a higher $HNO_3$ azeotrope, and the $HNO_3$ concentration may be above the normal azeotrope but yield a vapor of less than the normal azeotrope and the vapor from the entry plate is the controlling factor. For example, an 80% $HNO_3$ in $H_2O$ with about 100 parts $KNO_3$ per 100 parts solvent gives a vapor of about 76% $HNO_3$. If this were condensed as clean 76% $HNO_3$ on the first plate above the feed plate, the vapors from the 76% $HNO_3$ (now clean with no $KNO_3$) would be even higher in $HNO_3$ as the clean strong $HNO_3$ solution would tend to go downward toward the 68% $HNO_3$–$H_2O$ azeotrope, and thus remove acid instead of water.

The bottom stream from stripper 90 is now about 80% $HNO_3$ to 20% $H_2O$ and about 65 parts $KNO_3$ to 100 parts solvent, the acid concentration of the solvent having gone over 68% in column 90 only because of the presence of $KNO_3$ in the solution.

The bottom stream from column 90 is fed to evaporator 110 where strong acid vapors of about 80% $HNO_3$ are removed from the top and fed to fractionating column 120. The bottom stream evaporator 110 is a slurry of $KNO_3$ crystals in about 85% $HNO_3$ solvent and is recycled to dissolving tank 80. The fractionator 120 may be operated to remove up to 100% $HNO_3$ (generally 95–100%) as the overhead stream as product and the bottom stream down to the normal azeotrope of about 68% $HNO_3$ which is also recycled to dissolving tank 80.

As shown in FIG. 6, the only withdrawals from the system are $H_2O$ from the top of column 100 and $HNO_3$ from the top of fractionator 120. It is obvious, of course, that withdrawals can be made at many other points, particularly the strong clean $HNO_3$ from the top of evaporator 110 to thus eliminate fractionator 120, or the various recycles may be withdrawn or recycled to other points. As a practical matter, however, the recycle of $KNO_3$ permits operation of the system by the addition only of outside weak $HNO_3$ except for replacement of processing losses in $KNO_3$.

Figure 9:
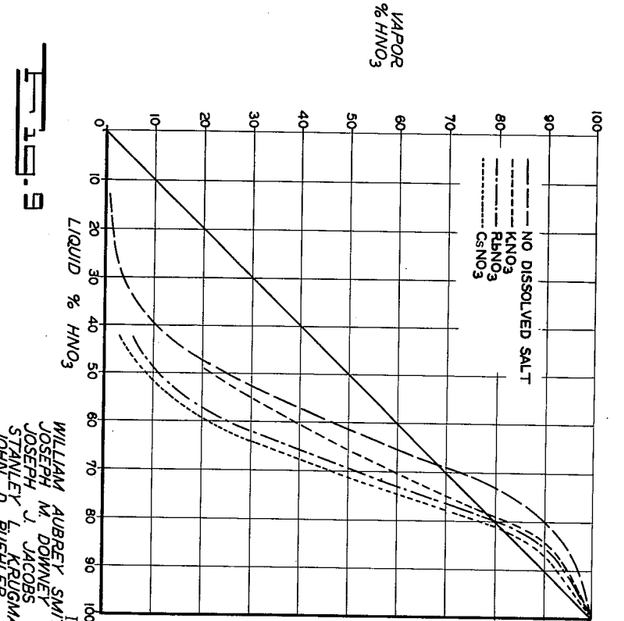
FIG. 9 is a graph showing the effect of various nitrates in solution on the azeotropic point of $HNO_3$–$H_2O$.

FIG. 9

The specific example described heretofore is concerned with potassium nitrate but largely the same results are obtained with both cesium and rubidium nitrates as will more specifically be noted from the vapor-liquid equilibrium diagram of FIG. 9, wherein the results of 50 parts of the three nitrates dissolved in 100 parts of $HNO_3$–$H_2O$ mixture of 620 mm. pressure are shown in comparison with $HNO_3$–$H_2O$ mixture without a metal nitrate therein.

TABLE I

As was previously known in the art, several compounds, including various nitrates (e.g., $NaNO_3$, $Ca(NO_3)_2$ and $Mg(NO_3)_2$), reduce the azeotrope point of nitric acid, i.e., these compounds tend to hold more water in the solution and thus permit greater evaporation of nitric acid and one would expect that the same would be true of all nitrates. In order to explain a possible theory of the present discovery various metal nitrates have been studied and considered. It would appear that alkali metal nitrates (i.e., group Ia of the periodic table) having an atomic weight as heavy or heavier than potassium will increase the azeotropic point, i.e., nitrates of potassium, rubidium, cesium and francium which are included within the scope of this invention. The following table sets forth the results noted on the azeotrope of $HNO_3$ with 50 parts of various metal nitrate salts in solution per 100 parts of solvent.

Table I

| Nitrate | Percent $HNO_3$ in solvent at azeotrope | Ionic radius, angstroms | Charge/radius |
|---|---|---|---|
| $CsNO_3$ | 82 | 1.67 | 0.599 |
| $RbNO_3$ | 80 | 1.48 | 0.675 |
| $KNO_3$ | 78 | 1.33 | 0.751 |
| None | 68 | | |
| $AgNO_3$ | 67 | 1.13 | 0.885 |
| $NaNO_3$ | 64 | 0.98 | 1.02 |
| $LiNO_3$ | 36 | 0.68 | 1.47 |
| $Ca(NO_3)_2$ | 39.5 | 0.94 | 2.13 |
| $Cu(NO_3)_2$ | 38 | 0.69 | 2.90 |
| $Mg(NO_3)_2$ | 28 | 0.65 | 3.07 |
| $Fe(NO_3)_3$ | 41 | 0.53 | 5.66 |
| $Al(NO_3)_3$ | 20 | 0.45 | 6.65 |

Thus it will be noted that silver nitrate has practically no effect and that sodium nitrate has only a slight effect but opposite to the nitrates of this invention.

It is believed that the relationship of the ionic radius to the charges (valence) on the metal atom determines the effect of the specific nitrate on the azeotrope point. Accordingly, the above table includes the ionic radius of the various metals and the ratio of the charge to the radius. Using this approach it will be observed that the results of the tested nitrates not only can be predicted but largely the degree of those results. Accordingly, all untested metal (except francium) nitrates will reduce the $HNO_3$ concentration at the azeotrope.

Figure 7:
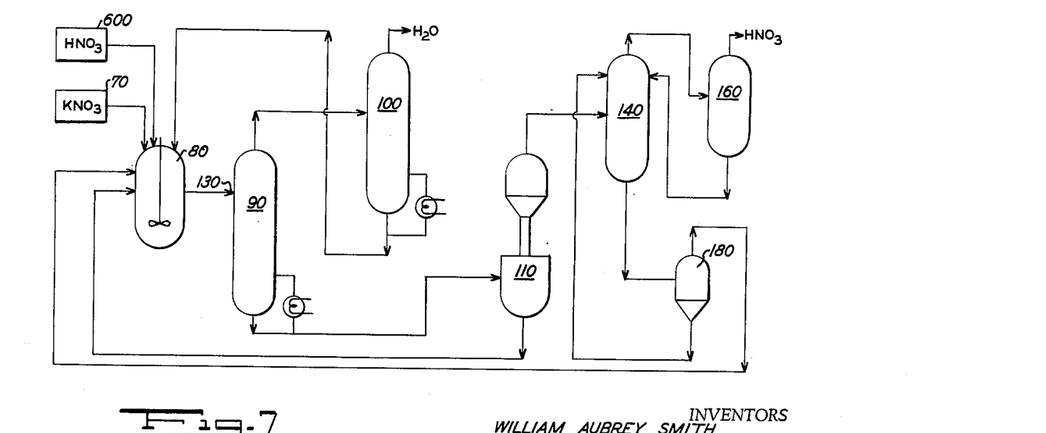
FIG. 7 is a diagrammatic flow sheet showing the concentrating of $HNO_3$ by combining alternately steps of this invention and prior art steps.

FIG. 7 FLOW

The majority of the nitrates (as shown in Table I) reduce the amount of $HNO_3$ in the azeotrope and it has been found that these azeotrope lowering nitrates may be used in combination with the azeotrope raising nitrates to produce strong $HNO_3$. In FIG. 7, the process is the same as FIG. 6 from dissolving tank 80 through evaporator 110 so that the drawings and reference numerals are identical. However, the overhead vapors from evaporator 110 may be passed into dehydrator 140 where they are contacted with a down-flowing solution of $Mg(NO_3)_2$ whereby an even stronger $HNO_3$ vapor is removed as overhead and passed to fractionator 160 if desired to increase the $HNO_3$ even higher. The fractionator bottoms (about 68% $HNO_3$) are recycled to the dehydrator. The bottoms from dehydrator 140 are concentrated with $Mg(NO_3)_2$ in evaporator 180 by removing weak $HNO_3$ overhead which is recycled to dissolving tank 80. The bottoms from evaporator 180 containing a very high concentration of magnesium nitrate are recycled to the top of dehydrator 140 to provide the $Mg(NO_3)_2$ for dehydrator 140.

Figure 8:
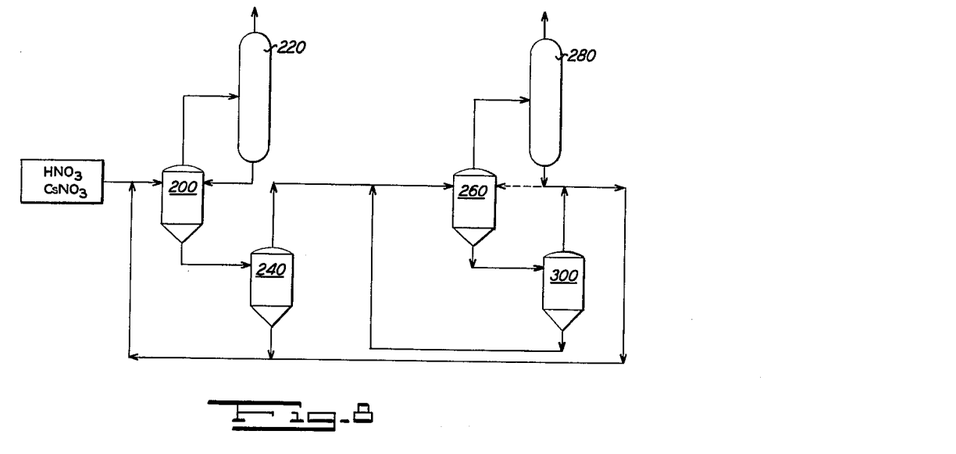
FIG. 8 is a diagrammatic flow sheet showing a modified combination of alternate steps.

FIG. 8 FLOW

An alternate combination is shown in FIG. 8 wherein a weak $HNO_3$ solution containing $CsNO_3$ is fed to evaporator 200. The evaporation is controlled so that the overhead vapors which are fed to rectifier 220 are below the normal azeotrope of 68% $HNO_3$. Water is removed by rectifier 220 and the bottoms of about 68% $HNO_3$ are recycled to evaporator 200. The bottoms from evaporator 200 are taken to evaporator 240 where the bottoms of very high $CsNO_3$ concentration are recycled to evaporator 200. The evaporation is controlled so that the overhead vapors from 240 are above or near 68% $HNO_3$ which are fed into evaporator 260 that contains a high concentration of $Mg(NO_3)_2$. This, of course, lowers the azeotrope point to about 20% $HNO_3$ and so the overhead vapors from this solution are much higher (and thus above 68%) in $HNO_3$ than the bottoms. The overheads are taken to a fractionator 280 and the bottoms are concentrated in evaporator 300 by removing near 68% $HNO_3$ overhead for recycle to evaporator 200. The bottoms from evaporator 300 is high in $Mg(NO_3)_2$ and low in $HNO_3$ and is recycled to evaporator 260.

Other alternatives that use the combination of azeotrope raising nitrates (Cs, Rb, K) and azeotrope lowering nitrates (Li, Ca, Cu, Mg, Fe, Al) will be obvious to those skilled in the art in light of this disclosure.

We claim:

1. A method of concentrating nitric acid in a water solution comprising dissolving in said solution a nitrate of a group Ia metal having an atomic weight at least as heavy as potassium and thereafter vaporizing said solution to remove vapors therefrom.

2. A method of producing strong nitric acid from a weak nitric acid solution comprising dissolving in said weak nitric acid solution a nitrate of a group Ia metal having an atomic weight at least as heavy as potassium and thereafter vaporizing said weak nitric acid-metal nitrate solution to remove vapors therefrom until the remaining solution is said strong nitric acid, said strong and said weak acids having acid concentrations respectively greater and lesser than the normal azeotropic mixture of nitric acid and water only.

3. A method of producing distilled strong nitric acid from a weak nitric acid solution comprising dissolving in said weak solution a nitrate of a group Ia metal having an atomic weight at least as heavy as potassium, fractionally distilling water vapors overhead from said weak nitric acid-metal nitrate solution until the remaining solution is strong nitric acid, and removing vapors from said remaining solution, whereby said vapors are said distilled strong nitric acid, said strong and said weak acids having acid concentrations respectively greater and lesser than the normal azeotropic mixture of nitric acid and water only.

4. The method of claim 3 wherein said metal nitrate is potassium nitrate.

5. A method of producing a second strong nitric acid from a first weak nitric acid solution comprising dissolving in said first weak nitric acid solution a nitrate of a group Ia metal having an atomic weight at least as heavy as potassium, boiling said weak nitric acid-metal nitrate solution, recovering the vapors from said boiling until a first strong nitric acid solution remains, fractionally distilling said recovered vapors to remove water vapor overhead and recover as bottoms a second weak nitric acid, recycling said second weak nitric acid to said first weak nitric acid solution, distilling said first strong nitric acid to recover distillate and residue, said distillate being said second strong nitric acid, said residue including said metal nitrate and a third strong nitric acid, and recycling said residue to said first weak nitric acid solution, said strong and said weak acids having acid concentrations respectively greater and lesser than the normal azeotropic mixture of nitric acid and water only.

6. A method of removing water in a column from a combined solution having components of nitric acid, water and a nitrate of a group Ia metal having an atomic weight at least as heavy as potassium, comprising introducing at a point intermediate the ends of said column said combined solution with a ratio of components such that the actual vapors from said solution have less nitric acid than azeotropic vapors of nitric acid in water only, forming said actual vapors, and fractionally distilling said actual vapors in said column above said point until substantially only water vapors are removed overhead.

7. A method of producing strong nitric acid from a weak nitric acid solution comprising dissolving in said weak solution a nitrate of a group Ia metal having an atomic weight at least as heavy as potassium, fractionally distilling water vapors overhead from said weak nitric acid metal nitrate solution until the remaining solution is strong nitric acid, vaporizing said remaining solution to remove vapors of strong nitric acid therefrom, and contacting said strong nitric acid vapors with a magnesium nitrate solution to produce a stronger nitric acid vapor as overhead and weak nitric acid-magnesium nitrate solution as bottoms, said strong and said weak acids having acid concentrations respectively greater and lesser than the normal azeotropic mixture of nitric acid and water only.

8. A method of reacting a chloride of a alkali metal selected from the group consisting of potassium, sodium and mixtures thereof with aqueous nitric acid to produce chlorine, nitrogen oxide, water and the corresponding alkali nitrate comprising first partially reacting the chloride with a first aqueous nitric acid, thereafter furthering the reaction by contacting strong nitric acid with the reaction vapors, and passing the acid remaining from the strong nitric acid into the reaction solution, said strong acid having an acid concentration greater than the normal azeotropic mixture of nitric acid and water only.

9. A method according to claim 8 wherein said first nitric acid is weak, said weak acid having an acid concentration less than the normal azeotropic mixture of nitric acid and water only.

10. A method according to claim 9 wherein the alkali metal chloride is potassium chloride and the nitric acid strength at the end of the reaction is at least 30%.

11. A method according to claim 10 wherein sufficient quantity of said strong nitric acid is added to drive the unreacted potassium chloride in the reaction mixture to substantially complete reaction.

12. A method of reacting a chloride of an alkali metal selected from the group consisting of potassium, sodium and mixtures thereof with aqueous nitric acid to produce chlorine, nitrogen oxide, water and the corresponding alkali metal nitrate comprising first partially reacting the chloride with a first aqueous nitric acid in a first zone, passing the reaction gases from the first zone to a second zone, furthering the reaction by contacting strong nitric acid with the reaction gases in the second zone, and passing the remaining nitric acid from the second zone to the first zone, whereby any nitrosyl chloride is oxidized to chlorine and nitrogen dioxide, said strong acid having an acid concentration greater than the normal azeotropic mixture of nitric acid and water only.

13. A method according to claim 12 wherein said first nitric acid is weak, said weak acid having an acid concentration less than the normal azeotropic mixture of nitric acid and water only.

14. A method according to claim 13 wherein at least part of the strong nitric acid is produced from the remaining acid by fractionally distilling water vapor therefrom in the presence of a nitrate of a group Ia metal having an atomic weight at least as heavy as potassium.

15. A method according to claim 14 wherein said nitrate is potassium and is produced from potassium chloride in the reaction.

16. A method according to claim 15 wherein said potassium nitrate forms a slurry and nitric acid vapor is removed from the slurry while potassium nitrate crystals are removed from the slurry, the nitric acid vapor being condensed to form said strong nitric acid for recycling.

17. A method according to claim 15 wherein the mixture of liquor and the potassium nitrate form a slurry and nitric acid vapor is removed from the slurry while potassium nitrate crystals are removed from the slurry, the nitric acid vapor being condensed to form an intermediate strong nitric acid from which water is then evaporated to form said strong acid for recycling to the gas reaction area.

18. A method according to claim 15 wherein the mixture of liquor and the potassium nitrate form a slurry and nitric acid vapor is removed from the slurry while potassium nitrate crytsals are removed from the slurry, the nitric acid vapor being condensed to form a second strong nitric acid for recovery per se.

19. A method according to claim 12 wherein said alkali metal chloride is potassium chloride and chloride impurities up to 10% of sodium, calcium or magnesium are present whereby a nitrate mixture of potassium and sodium, calcium or magnesium is formed, dissolving said nitrate mixture in a solution, evaporating said solution to supersaturation of said nitrates, crystallizing said potassium nitrate in an excess of said supersaturated solution by growing large crystals on small potassium nitrate nuclei, whereby said impurities form only small crystals, and separating said large crystals of potassium nitrate from said small crystals by size classification.

20. A method according to claim 12 wherein the said alkali metal chloride is sylvinite whereby a nitrate mixture of potassium and sodium is formed, dissolving said nitrates in weak nitric acid at a concentration where the solubility of potassium nitrate is at its lowest, removing vapors from said weak nitric acid until crystallization of sodium nitrate, said vapor removal increasing the concentration of said nitric acid whereby the solubility of potassium nitrate therein will increase and the solubility of sodium nitrate continues to decrease, and separating said sodium nitrate crystals from said concentrated nitric acid.

21. A method according to claim 12 wherein the reaction zone is divided into at least two areas, the second area being a gas reaction area for furthering the reaction and the first area being a solution reaction area for the partial reaction and the strong nitric acid is added in the gas reaction area countercurrently to the reaction gases therein.

22. A process of oxidizing hydrochloric acid to chlorine comprising reacting said hydrochloric acid with sufficient excess nitric acid, at least part of which is a first strong nitric acid, to form a weak nitric acid solution of at least 40% at the end of said reaction, removing nitrogen oxides and said chlorine as gases, fractionally distilling water vapors from said weak nitric acid solution in the presence of a dissolved nitrate of a group Ia metal having an atomic weight at least as heavy as potassium until the remaining solution is a second strong nitric acid, and recycling at least part of said second strong nitric acid as said first strong nitric acid, said strong and said weak acids having acid concentrations, respectively, greater and lesser than the normal azeotropic mixture of nitric acid and water only.

23. A process of oxidizing hydrochloric acid to chlorine comprising introducing said hydrochloric acid and nitric acid into a first zone, introducing first strong nitric acid into a second zone, providing heat to boil any liquids in said zones, passing reaction gases from said first zone into said second zone, exposing said reaction gases in said second zone to said first strong nitric acid to oxidize any nitrosyl chloride to chlorine and nitrogen dioxide, passing said exposed nitric acid of said second zone to said first zone, the total amount and concentration of said nitric acids being sufficient to complete the reaction and to have a weak nitric acid solution of at least 40% concentration at the end of said reaction, passing said chlorine and nitrogen dioxide gases from said second zone, withdrawing the weak nitric acid solution from said first zone, fractionally distilling water vapors from said withdrawn nitric acid solution in the presence of a dissolved nitrate of a group Ia metal having an atomic weight at least as heavy as potassium until the remaining solution is a second strong nitric acid, and recycling at least part of said second strong nitric acid as said first strong nitric acid, said strong and said weak acids having acid concentrations, respectively, greater and lesser than the normal azeotropic mixture of nitric acid and water only.

24. A process of oxidizing hydrochloric acid to chlorine comprising introducing hydrochloric acid and nitric acid at the top of a first column zone, passing reaction gases from the top of said first zone to the bottom of a second column zone, providing heat to boil any liquids in said zones, introducing a first strong nitric acid into said second column zone in sufficient strength and quantity to convert any nitrosyl chloride present to chlorine and nitrogen dioxide, said zones forming portions of a functional vertical column with said first zone being below said second zone, the total amount and concentration of said nitric acids being sufficient to have a weak nitric acid of at least 40% concentration at the bottom of said first zone after completion of the reactions, removing the bottoms of said first zone, fractionally distilling water vapors from said first zone bottoms in the presence of a dissolved nitrate of a group Ia metal having an atomic weight at least as heavy as potassium until the remaining solution is a second strong nitric acid, and recycling at least part of said second strong nitric acid as said first strong nitric acid, said strong and said weak acids having acid concentrations, respectively, greater and lesser than the normal azeotropic mixture of nitric acid and water only.

25. The process of claim 24 wherein the nitric acid is at least 72% at the bottom of said second zone after conversion of said nitrosyl chloride.

26. The process of claim 25 wherein said weak nitric acid is at least about 57%.

27. The process of calim 24 wherein said metal nitrate dissolved in a portion of said second nitric acid is recycled to said fractional distillation step.

28. The process of claim 24 wherein said metal nitrate dissolved in a portion of said second strong nitric acid is recycled to said first zone.

29. The process of claim 24 wherein said strong nitric acid containing said metal nitrate is partly distilled, the distilled portion being recycled as said first strong nitric acid and the remaining portion containing said metal nitrate being recycled through said fractional distillation step.

30. The process of claim 24 wherein said metal is potassium.

No references cited.

MAURICE A. BRINDISI, *Primary Examiner.*